(12) United States Patent
Park

(10) Patent No.: US 10,888,165 B2
(45) Date of Patent: Jan. 12, 2021

(54) TELESCOPIC SINGLE-LEGGED PORTABLE WORKING CHAIR

(71) Applicant: Donggwan Park, Busan (KR)

(72) Inventor: Donggwan Park, Busan (KR)

(*) Notice: Subject to any disclaimer, the term of this patent is extended or adjusted under 35 U.S.C. 154(b) by 0 days.

(21) Appl. No.: 16/478,731

(22) PCT Filed: Jan. 11, 2018

(86) PCT No.: PCT/KR2018/000532
§ 371 (c)(1),
(2) Date: Jul. 17, 2019

(87) PCT Pub. No.: WO2018/135801
PCT Pub. Date: Jul. 26, 2018

(65) Prior Publication Data
US 2020/0046124 A1 Feb. 13, 2020

(30) Foreign Application Priority Data

Jan. 19, 2017 (KR) .................. 10-2017-0009444

(51) Int. Cl.
*A47C 1/00* (2006.01)
*A47C 7/34* (2006.01)
(Continued)

(52) U.S. Cl.
CPC .............. *A47C 7/34* (2013.01); *A47C 7/002* (2013.01); *A45F 2004/026* (2013.01);
(Continued)

(58) Field of Classification Search
CPC ......... A47C 30/26; A47C 7/004; A47C 7/002; A47C 7/029; A47C 7/34; A47C 9/10;
(Continued)

(56) References Cited

U.S. PATENT DOCUMENTS 4,872,665 A * 10/1989 Chareire .............. A61H 1/0237
482/51
4,993,085 A * 2/1991 Gibbons .............. A61G 7/1007
4/237

(Continued)

FOREIGN PATENT DOCUMENTS

JP 2007097859 A 4/2007
JP 2008055140 A 3/2008
(Continued)

OTHER PUBLICATIONS

Search Report dated May 24, 2018 for PCT Application No. PCT/KR2018/000532.

*Primary Examiner* — Syed A Islam

(57) ABSTRACT

The present invention relates to a single-legged portable working chair using a compression repulsive force of a spring body, wherein: when used, the telescopic single-legged portable working chair is worn on a user's body such that, when the user sits down, the spring body is compressed by the weight of the user's body to store power, and when the user stands up, the spring body pushes up the user's body using the compressed power, so that the power consumption required for the sitting and standing actions of the body can be reduced; when the user repeatedly lifts a weight, the load applied to the user's joints and muscles is alleviated by the magnitude of a repulsive force of the spring body.

3 Claims, 6 Drawing Sheets

(51) Int. Cl.
*A47C 7/00* (2006.01)
*A47C 9/02* (2006.01)
*A47C 3/026* (2006.01)
*A61G 5/14* (2006.01)
*A47C 9/10* (2006.01)
*A61H 3/00* (2006.01)
*B25J 9/00* (2006.01)
*A45F 4/02* (2006.01)
*A47C 7/02* (2006.01)

(52) U.S. Cl.
CPC .............. *A47C 3/026* (2013.01); *A47C 7/029* (2018.08); *A47C 9/025* (2013.01); *A47C 9/027* (2013.01); *A47C 9/10* (2013.01); *A61G 5/14* (2013.01); *A61H 3/008* (2013.01); *B25J 9/0006* (2013.01)

(58) Field of Classification Search
CPC ......... A47C 9/025; A47C 9/027; A47C 9/029; A45F 2004/026; A61H 3/008; A61G 5/14; B25J 9/0006
USPC .................................................. 297/DIG. 10
See application file for complete search history.

(56) References Cited

U.S. PATENT DOCUMENTS

| | | | |
|---|---|---|---|
| 5,927,797 A | | 7/1999 | Ferguson |
| 10,271,660 B2* | | 4/2019 | Gunura ................. A61F 5/0125 |
| 2016/0213549 A1* | | 7/2016 | Iida ........................ A47C 9/025 |
| 2018/0317655 A1* | | 11/2018 | Frybarger .............. A47C 9/025 |

FOREIGN PATENT DOCUMENTS

| | | | | |
|---|---|---|---|---|
| JP | 2010154929 A | | 7/2010 | |
| KR | 20120030905 A | | 3/2012 | |
| KR | 20150000180 U | | 1/2015 | |
| WO | WO-2017067706 A1 * | | 4/2017 | ............. A47C 9/025 |

* cited by examiner (I)  (II)

TELESCOPIC SINGLE-LEGGED PORTABLE WORKING CHAIR

CROSS-REFERENCE TO RELATED APPLICATIONS

This application is a U.S. National Phase of International Application No. PCT/KR2018/000532, filed Jan. 11, 2018, which claims priority to Korean Patent Application No. 10-2017-0009444, filed Jan. 19, 2017.

TECHNICAL FIELD

The present invention relates to a single-legged portable working chair using a compression repulsive force of a spring body, wherein: the telescopic single-legged portable working chair is worn on a user's body such that, when the user sits down, the spring body is compressed by the weight of the user's body to store power, and when the user stands up, the spring body pushes up the user's body using the compressed power to thereby reduce the power consumption required for the sitting and standing actions of the body; and when the user repeatedly lifts a weight, the load applied to the user's joints and muscles is alleviated by the magnitude of a repulsive force of the spring body to thereby reduce injuries to the body due to work over a long period of time.

BACKGROUND ART

In manufacturing and agricultural work fields, people repeatedly change their positions between standing and sitting while working, and they often squat when sitting down, but this repetitive position change between standing and sitting hurts lower limb of a human body, such as knees, ankles, hip joints, etc. Due to characteristics in the work fields, it is difficult to use common types of chair and thus foldable chair, rolling chairs, puffy cushions, and the like have been used, but even they cannot help reduce load applied to the lower body when a person stands up, and these existing ways are uncomfortable to use especially in agricultural work fields due to obstacles such as an uneven floor and dried soil. There is a sedentary mobile working vehicle using drive power, but this type of equipment can be used limitedly in protected cultivation conditions where a floor is levelled out evenly.

DISCLOSURE

Technical Problem

The present invention is to improve potability and mobility convenience difficult to achieve using an existing chair or working table, to overcome spatial constraints, and to reduce a user's power consumption and injuries to lower limb due to a standing-and-sitting actions and an action of repeatedly lifting a heavy object.

Technical Solution

A telescopic single-legged portable working chair according to the present invention includes: a spring body comprised of a cylinder and a piston and having eye rods disposed at both ends; a lower frame connected to a lower eye rod of the spring body via a lower shaft; an upper frame connected to an upper eye rod of the spring body via an upper shaft; a saddle frame fixed to the upper frame in a horizontal direction; a trigger installed below a top cover of the upper frame to control movement of the lower frame and the spring body; and a belt connected to the upper frame and enabled to be worn on a human body, wherein movement is easily performed, spatial restrictions are reduced, and, when a user sits down, a weight of the user's body is stored in the spring body and the stored repulsive force is used when the user stands up, thereby reducing a load to the body.

The saddle is dynamically connected to the frame, a coil spring is disposed between the saddle and a saddle frame, and a change in weight acting on the saddle due to a preceding action prior to a standing-and-sitting action of a human body is used as an electrical signal by a mechanical or pressure sensor and the signal is used in conjunction with a trigger to control operation of the spring is controlled, and accordingly, the compressed spring body is released only upon a standing action of a user, thereby preventing the spring body from operating regardless of the user's intent and thus enabling stable use. When the user sits down, the chair forms a triangulation point together with two legs, and an axial bearing is installed at a lower end of the lower part to which most of the weight of the body is applied, so that direction change (rotation) in a sitting position about the lower frame can be easily made.

Advantageous Effects

In the case of a work task which requires a user to frequently sit down and stand up and keep moving around, when a user sits down, the spring body is compressed by the weight of the user's body to store power, and, when the user stands up, the spring body pushes up the user's body by the compressed power to reduce the power consumption required for the user, and as a result, the load applied to the user's joints and muscles is alleviated to thereby reduce injuries to the user's body caused by a long hour work and there are less influences from work space and an uneven floor to thereby improve work convenience.

BEST MODE

Figure 1:
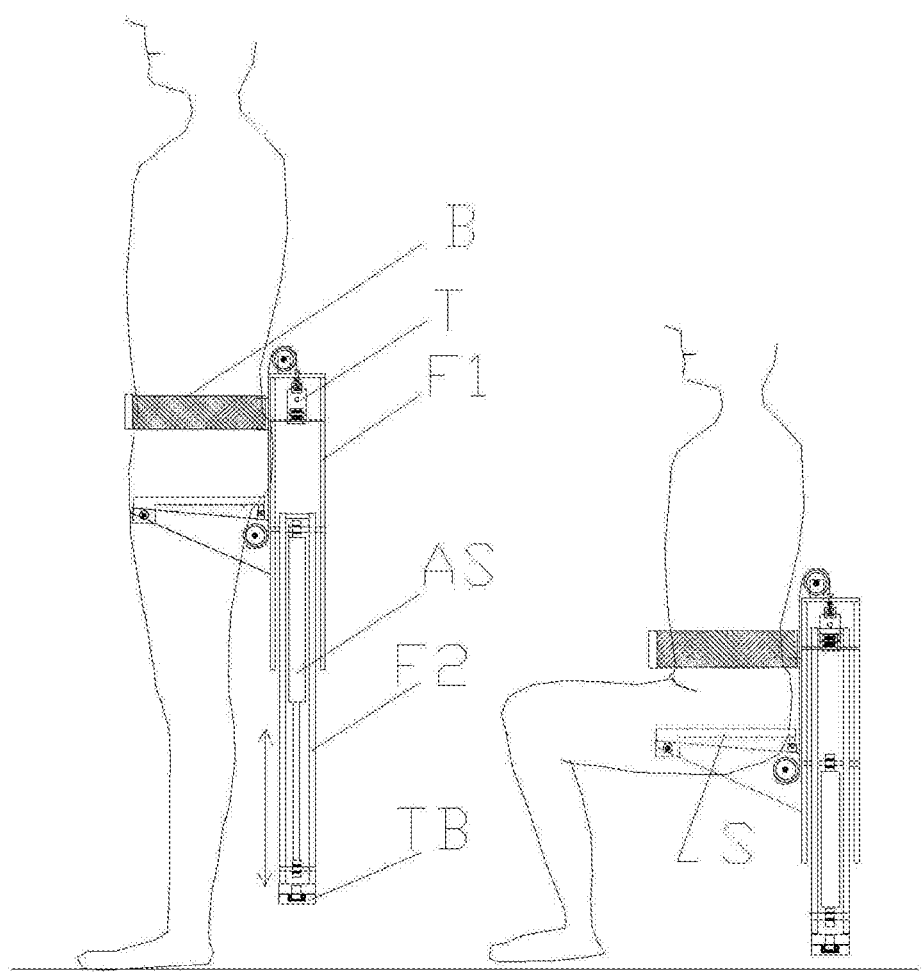
FIG. 1 is a side view of operations of a spring body and a lower frame when a user stands up and sits down wearing a single-legged portable working chair according to the present invention.

In FIG. 1,

There is illustrated a state in which a saddle S of a single-legged portable working chair according to the present invention is placed between groins likewise a bicycle riding position and a belt of the working char is worn on a user's waist, wherein, when the user is standing, all functions of the working chair are stopped and a lower end of a main body of the working chair are off the ground. Upper and lower frames are classified as external and internal frames to form a telescope shape. When the user sits down, the lower end of the main body is fixed to a random point on the ground and a spring body AS is compressed by the weight of the user's body to thereby store energy. The lower frame F2 is pushed up to a predetermined operating distance such that a locking bar LB disposed at the top of the lower frame is engaged with and fixed to a trigger T. If the trigger releases the locking bar LB in a way of an action preceding to a standing action, the spring body pushes up the user's body through the upper frame F1 and the saddle S by a stored repulsive force and thus reuses human energy to relieve the user's power.

MODE FOR INVENTION

Figure 2A:
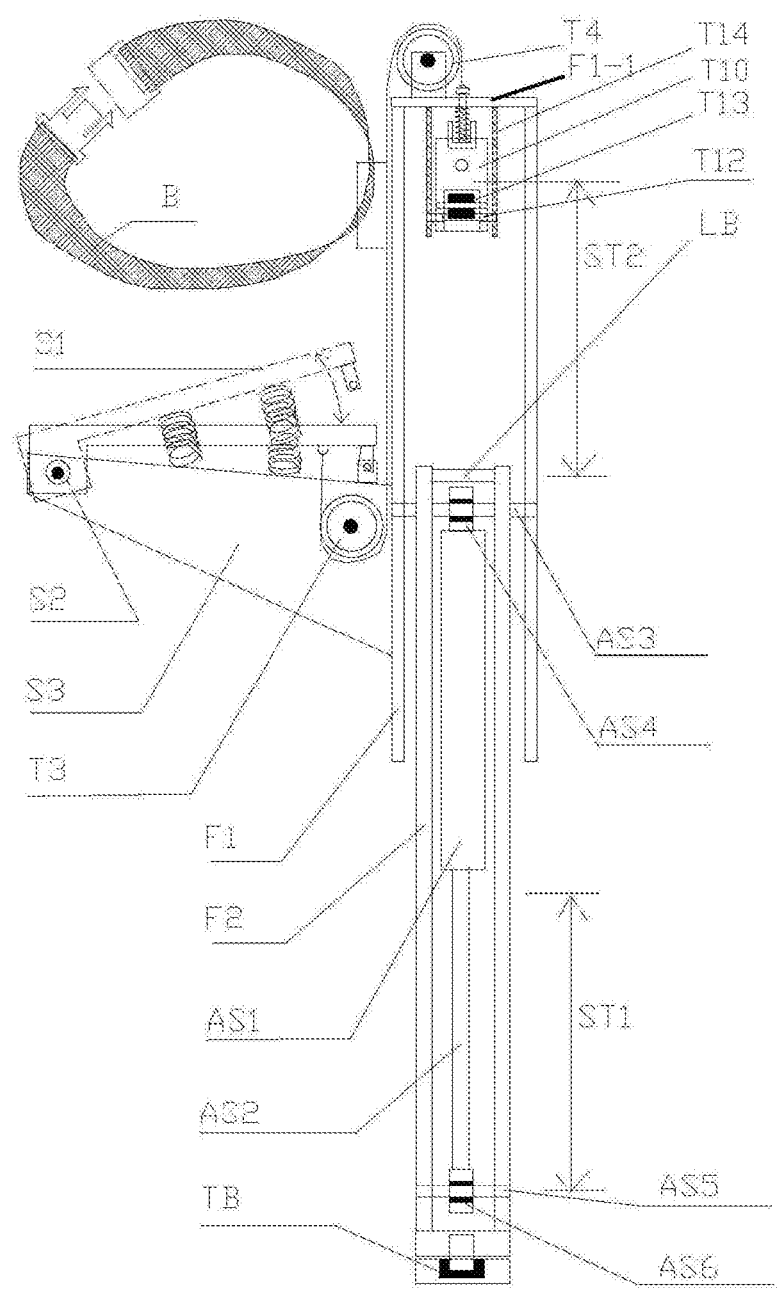
FIG. 2A is a side view illustrating the entire structure and elements of a single-legged portable working chair according to the present invention.
Figure 2B:
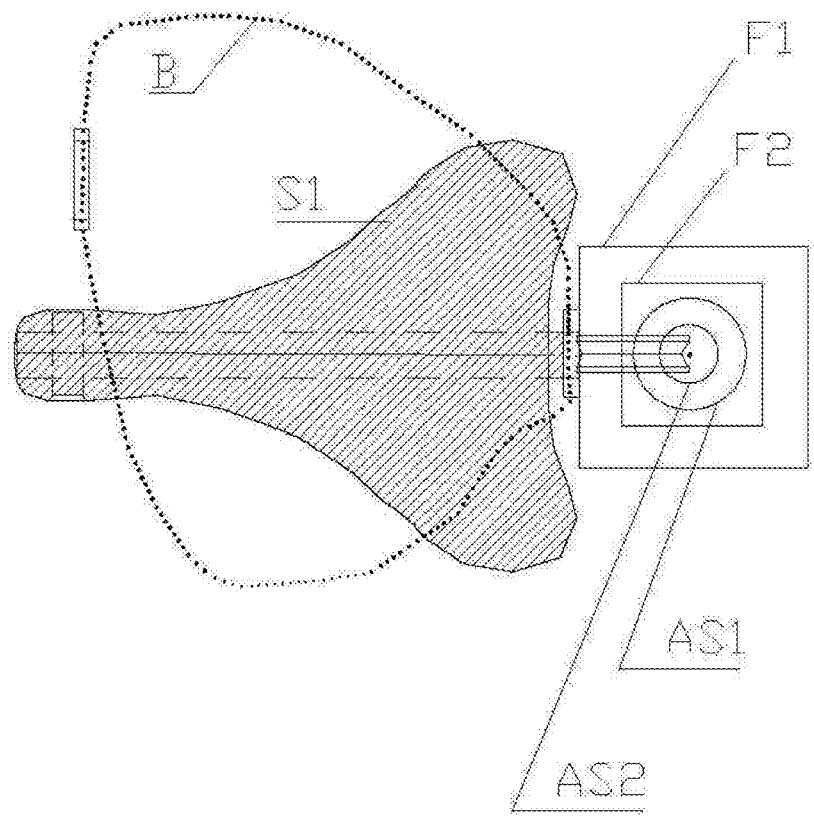
FIG. 2B is a plan view illustrating the entire structure and elements of a single-legged portable working chair according to the present invention.

In FIG. 2A and FIG. 2B,

The entire structure and elements of the single-legged portable working chair are illustrated. The spring body AS is disposed inside the lower frame F2, a spring upper eye rod AS4 is connected to the upper frame F1 through an upper eye rod shaft AS3, a spring lower eye rod AS6 is dynamically connected to the lower frame F2 through a lower eye rod shaft AS5, wherein, upon operation of the spring body, the lower frame F2 moves inside the upper frame F1 in the same direction as that of the spring body by the same distance as that of the spring body. That is, a stroke ST1 of the spring body and a lower frame stroke ST2 are the same. Within a trigger frame T14 installed under a top cover F1-1 of the upper frame F1, there are provided a trigger arm roller T13, a trigger arm T10, and a trigger slider T8. The trigger arm T10 restricts or releases a lower frame locking bar LB going upward through the trigger arm roller T13 to control operation of the spring body and the lower frame. Controlling of a trigger will be further described with reference to FIGS. 4 and 5. An axial bearing TB is installed at a lower end of the lower frame F2 so as to allow free rotation when a load is applied to the frame, so that leftward and rightward rotation is enabled easily when a user sits down.

Figure 3:
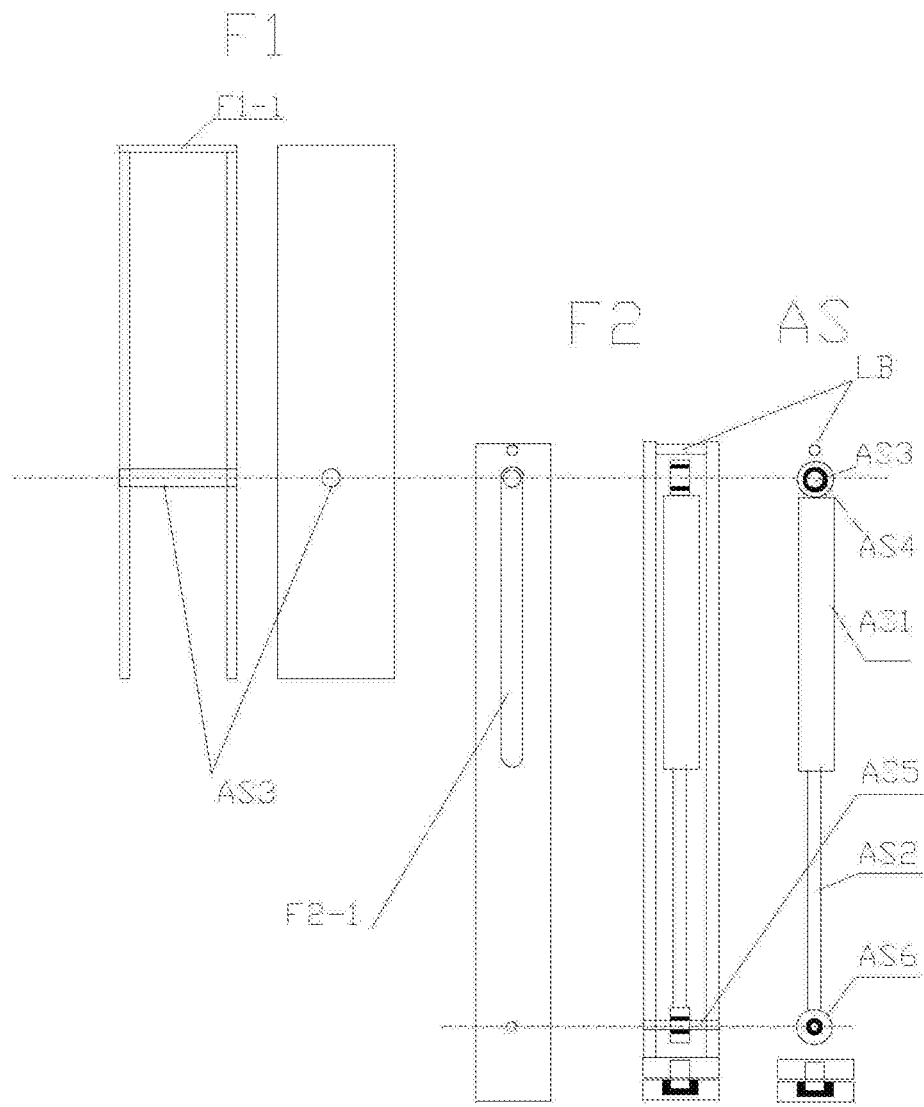
FIG. 3 is an exploded view illustrating how an upper frame, a lower frame, and a spring body are coupled.

In FIG. 3,

The upper frame and the lower frame are flexibly connected only through the spring body AS. The upper frame, which corresponds to an external frame, also plays a role of a guide for the lower frame (the internal frame), and a slot F2-1 of a length exceeding a length of the lower frame stroke ST2 is disposed in the lower frame, so that the upper eye rod shaft AS3 passing through the center of the upper frame to be fixed to the upper frame is not disturbed by movement of the lower frame (the internal frame).

Figure 4:
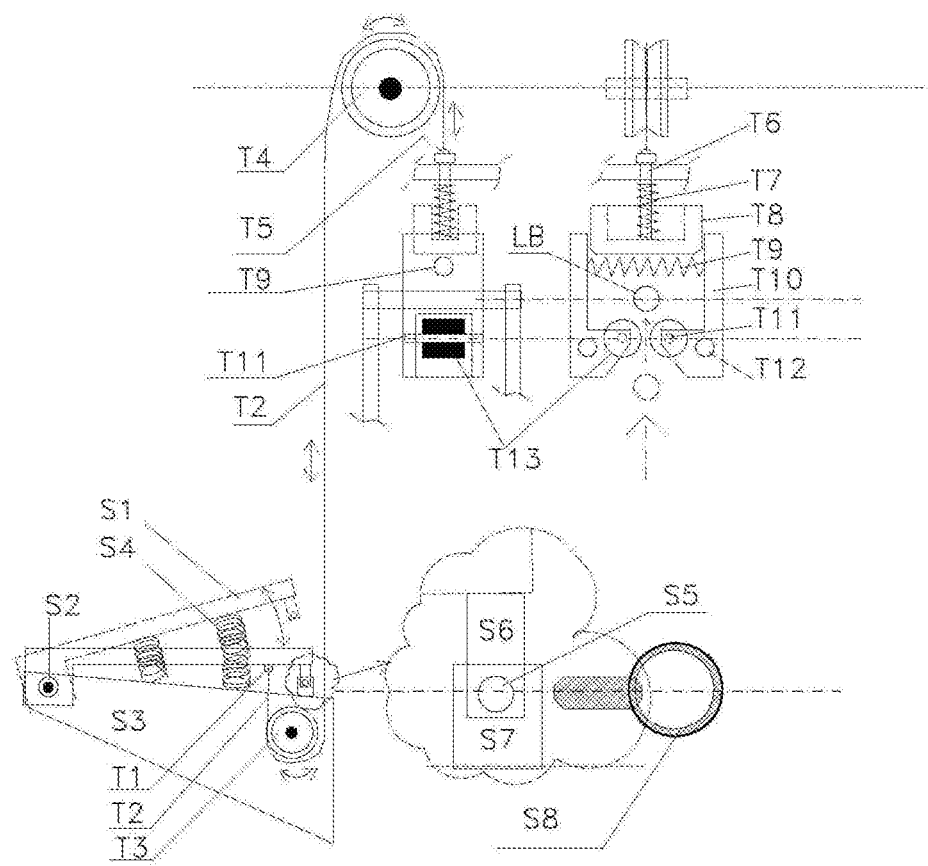
FIG. 4 is a structure view illustrating interaction between a saddle and a trigger.
Figure 4:
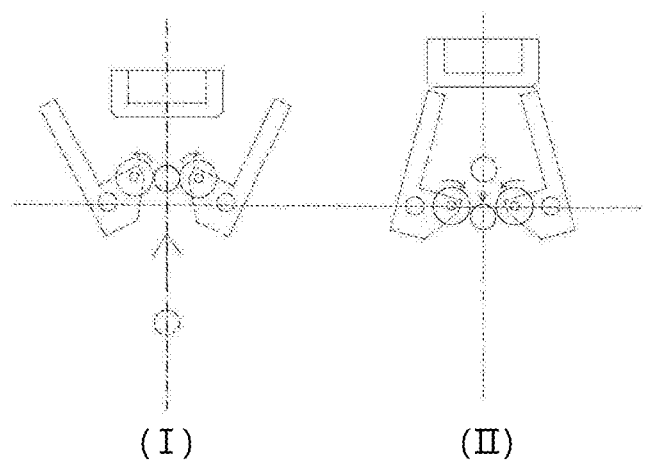

In FIG. 4,

Controlling of the trigger by interaction between the saddle S1 and the trigger T is illustrated.

A compression force of the saddle spring body S4 is greater than a compression force of a trigger slider spring body T7. When a user is wearing the single-legged portable working chair while standing, the saddle S1 is lifted about a hinge S2 by a saddle spring body S4 and ended up with pulling a trigger line T2 connected to the bottom of the saddle S1, and accordingly, the saddle S1 is maintained to lift up the trigger slider T8 through trigger line pulleys T3 and T4 and a trigger slider shaft T6. If a load is applied to the saddle upon a sitting action, the saddle is lowered down about the hinge S2 against a repulsive force of the saddle spring body S4 and releases the trigger line. The trigger slider T8 lifted by a force of the saddle spring body is lowered down inside the trigger arm T10, whist a load applied to the saddle is increased by a user's weight, and the load pushes up the lower frame F2 against the repulsive fore of the spring body. In a complete sitting position, the spring body is stopped with maintaining a predetermined maximum repulsive force, and the locking bar LB at the top of the lower frame passes through a pair of trigger arm rollers T13 to inwardly open the trigger arm and go upward, and the trigger arm is closed again by tension of the trigger arm spring body T9. The trigger arm T10 is not allowed to be opened when the trigger slider T8 is lowered, and thus, the lower frame remains fixed through the locking bar while a user sits down.

When a user stands up from a sitting position, a preceding operation thereof is performed to move the center of the upper body forward and lift the hip from the rear at the same time. This preceding action moves a load, being applied to the saddle, forward and reduce the load at the same time. If the load is reduced to be smaller than the repulsive fore of the saddle spring body, the saddle is lifted about the hinge.

If the saddle S1 is lifted by the action preceding to the standing action and the trigger slider T8 is lifted up as a result of pulling the trigger line T2, the locking bar LB passes through the trigger arm rollers T13 to outwardly open the trigger arm and be then lowered. As the standing action continues, the spring body completely pushes up the upper frame F1 by a repulsive force. In the saddle, a saddle fixing plug S6 and a saddle fixing socket S7 are fastened by a saddle fixing fin S8 to thereby stop operation of the spring body and the lower frame.

If a pressure sensor is installed between the saddle S1 and the saddle frame S3 and the trigger slider T8 is controlled by a solenoid controlled by the pressure sensor, mechanical control by the saddle spring body and the trigger line may be replaced with electrical and electronic control.

Figure 5:
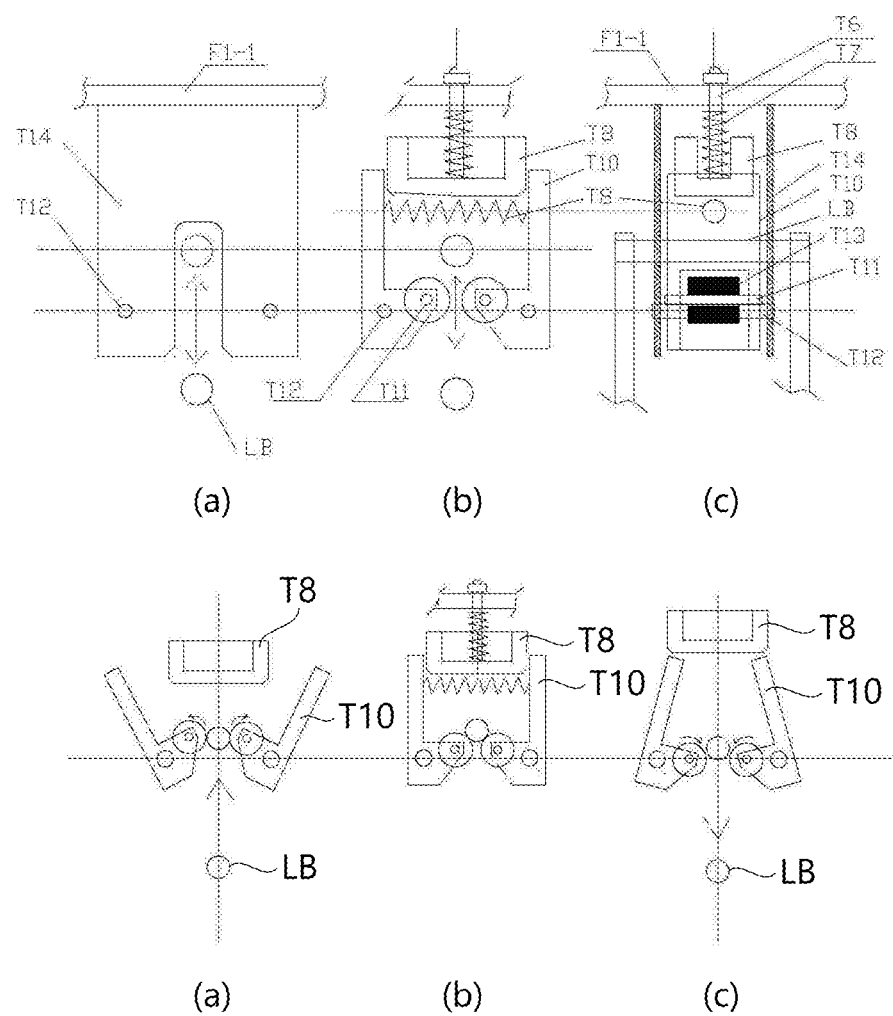
FIG. 5 is a detailed view illustrating a structure and three operations of a trigger.

In FIG. 5,

A detailed structure of the trigger T and an operating status of the trigger arm T10 according to in-and-out operation of the locking bar LB are illustrated. (a) is an exterior surface of the trigger frame T14 as viewed from the front, and (b) is an internal cross section of the trigger as viewed from the front, wherein a pair of trigger arms T10 with a roller installed therein is fastened by a trigger arm fin T12, the trigger slider T8 is installed at the upper frame top cover by the trigger slider shaft T6, and the trigger slider refrains the trigger arm from being opened outwardly, so that the locking bar LB is held inside the trigger arm T10. (c) is a side cross-sectional view of the trigger and illustrates a state in which the upper frame is locked to the trigger through the locking bar LB. (d), (e), and (f) illustrate operations of the trigger arm T10 that operates in conjunction with movement of the locking bar LB and the trigger slider T8. (d) illustrates an inwardly opened state caused by introduction of the locking bar LB, (e) illustrates a locked state caused by the trigger slider T8, and (f) illustrates deviation of the locking bar LB caused by sliding-out of the trigger slider T8.

INDUSTRIAL APPLICABILITY

The single-legged portable working chair has industrial applicability since the working chair is useful to reduce power consumption when the working chair is worn on by a field worker who frequently sits down and stands up to work.

The invention claimed is:

1. A telescopic single-legged portable working chair capable of reusing human energy, the chair comprising:
an upper frame; and a lower frame with a locking bar provided at the top of the lower frame, and telescoped inside the upper frame;
a cylinder and a piston provided in the lower frame;
a saddle frame fixed to the upper frame;
a saddle hinged on the saddle frame;
a saddle spring provided between the saddle and the saddle frame;
a trigger line connected at one side of the saddle and being pulled as the saddle is lifted:
a pair of trigger arms provided inside the upper frame, and configured to pivot to lock or unlock the locking bar;
a trigger slider connected to the trigger line, being moved under tension on the trigger line, and configured to prevent the pair of trigger arms from pivoting when the trigger slider is positioned between the pair of trigger arm; and
a trigger slider spring configured to return a position of the trigger slider;
wherein the lower frame stores energy due to gravity acting on a body when sitting on the saddle so as to push the body when standing up.

2. The telescopic single-legged portable working chair of claim 1, further comprising a thrust bearing provided at a lower end of the lower frame so as to rotate the lower frame when a user is seated.

3. The telescopic single-legged portable working chair of claim 1, wherein the trigger slider prevents the pair of trigger arms from opening outward when the trigger slider is positioned between the pair of trigger arm.

\* \* \* \* \*